United States Patent Office 3,794,646
Patented Feb. 26, 1974

3,794,646
5,7-DISUBSTITUTED-1,9-TETRAMETHYLENE-1,4-BENZODIAZEPIN-2-ONES
William John Welstead, Jr., and Ying-Ho Chen, Richmond, Va., assignors to A. H. Robins Company Incorporated, Richmond, Va.
No Drawing. Continuation-in-part of abandoned application Ser. No. 28,561, Apr. 14, 1970. This application Jan. 18, 1972, Ser. No. 218,834
Int. Cl. C07d 53/06
US. Cl. 260—239.3 T                3 Claims

ABSTRACT OF THE DISCLOSURE

The preparation of compounds of the formula

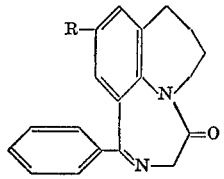

wherein R is hydrogen and chlorine is described. The compounds were shown to protest mice against convulsions induced by electroshock or chemical means.

---

The present invention relates to heterocyclic organic compounds which may be referred to as 1,4-benzodiazepin-2-ones and is more particularly concerned with 5,7-disubstituted-1,9-tetramethylene-1,4 - benzodiazepin - 2-ones and processes for making them.

The present application is a continuation-in-part of copending application Ser. No. 28,561, filed Apr. 14, 1970, now abandoned.

The novel 1,4-benzodiazepin-2-ones of the present invention have the formula:

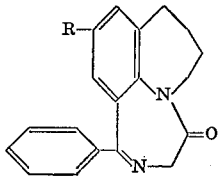

Formula I wherein;
R is selected from the group consisting of hydrogen and chlorine.

The novel compounds of Formula I were tested for their ability to prevent convulsions and/or death induced by maximal electroshock or by pentylenetetrazol administration. The method used was a modification of Swinyard et al. J. Pharmacol. Exp. Therap. 106, 319–330 (1952). After establishing the approximate protective doses, groups of five mice (female, ICR strain) received geometrically spaced doses of 5-phenyl-1,9-tetramethylene-1,4-benzodiazepin-2-one (Example 2) and 7-chloro-5-phenyl-1,9-tetramethylene-1,4-benzodiazepin - 2 - one (Example 4) intraperitoneally. Sixty minutes later each animal was challenged by electrical or chemical means. For electrical stimulation of the corneas, parameters were 60 Hz., 3 msec. pulse width for two seconds and sufficient voltage (usually 20–32 v.) to produce an immediate tonic seizure in each of five control animals. Pentylenetetrazol, 100 mg./kg. IP, produced clonic convulsions and death in all control mice within ten minutes. Prevention of tonic seizures after electrical challenge and of death after chemical challenge were determined for the compounds of Examples 2 and 4 and $ED_{50}$'s calculated using the method of Litchfield and Wilcoxon, J. Pharmacol. Exp. Therap., 96, 99–113 (1949). The results are given in Table I.

TABLE I

| Example | Protective $ED_{50}$ (95% confidence limits) mg./kg. IP | |
|---|---|---|
| | Electroshock | Pentylenetetrazol |
| 2 | 118.0 (72.5–192) | 65.0 (26–162) |
| 4 | 18.0 (11.2–28.8) | 4.5 (1.6–13.1) |

It is, therefore, an object of the present invention to provide new and useful 5,7-disubstituted-1,9-tetramethylene-1,4-benzodiazepin-2-ones. A further object is to provide methods for making the novel compounds of the present invention. Other objects will be apparent to one skilled in the art, and still others will become apparent hereinafter.

The compounds of the present invention are prepared by reacting a 9-benzoyl-2,3,4,5-tetrahydrobenzazepine of Formula II:

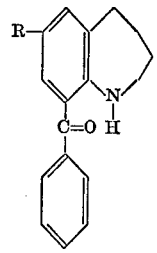

Formula II wherein R is as defined above with bromoacetyl bromide to give a 1-bromoacetyl-9-benzoyl-2,3,4,5-tetrahydrobenzazepin of Formula III, wherein R is as defined above.

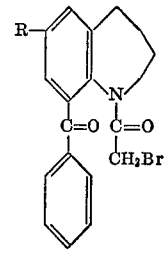

Formula III

The compound of Formula III is reacted with ammonia in a lower alkanol solvent to effect cyclization to give the novel compounds of Formula I.

In an alternate method, a compound of Formula III can be reacted with a lower alkyl glycinate to give the novel compounds of Formula I.

The first step of the process, i.e., the conversion of a compound of Formula II to a compound of Formula III is preferably effected by dissolving a compound of Formula II in a halogenated hydrocarbon solvent, illustratively chloroform, and adding the solution to a mixture of ice water and an acid binding agent, for example, sodium carbonate. The well-stirred heterogeneous mixture is treated dropwise with a solution of bromoacetyl bromide in the same halogenated hydrocarbon. The course of the reaction can be monitored by aliquot analysis of the reaction mixture using thin layer chromatography. The process is continued until there is indication that no starting material remains. The organic and aqueous layers are separated, the organic layer is dried over an appropriate drying agent as, for example, sodium sulfate, and the dried organic solution is concentrated to an oil, preferably under reduced pressure. The oil can be used directly in the next step or it can be purified by crystallization prior to its use.

The second step of the process, i.e., the conversion of a compound of Formula III to a compound of Formula I is effected by adding a compound of Formula III to a cold solution of a lower alkanol, preferably methanol, which has been saturated with ammonia or by treating a cold alcoholic solution of a compound of Formula III with ammonia. The reaction mixture is stirred at the lower temperature for a period of from about one hour to about three hours and is then allowed to warm to room temperature. The reaction mixture is stirred for an additional period of from about three to about ten hours and is then poured into water. The cyclized product of Formula I, which separates as a crystalline solid, is collected by filtration and purified by crystallization from a suitable solvent.

The compounds of Formula II, which are used as the starting materials for the novel compounds of the present invention, are prepared as shown below in Chart I starting from the appropriate 2,3,4,5-tetrahydrobenzazepine. In Chart I, R has the values given above.

CHART I

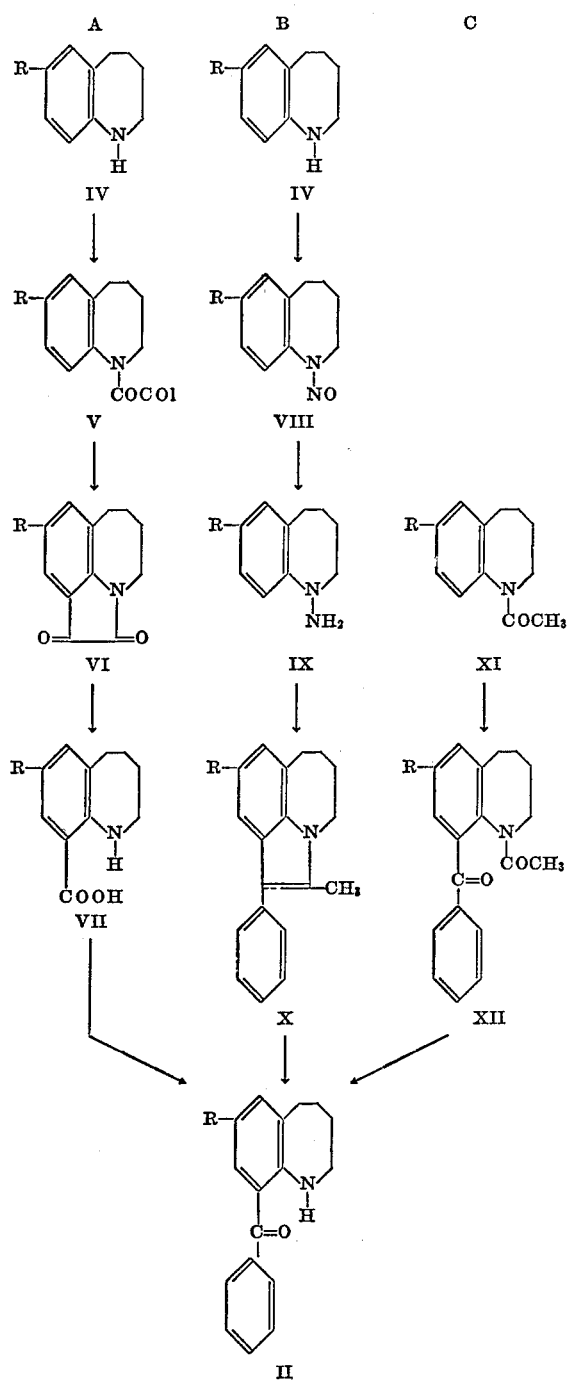

The starting materials represented by Formula II can be prepared as shown in Chart I by one or more methods. In a preferred method of preparation, a 2,3,4,5-tetrahydrobenzazepine of Formula IV is dissolved in a chlorinated hydrocarbon solvent, illustratively chloroform, and the solution is added to a solution of oxalyl chloride in the selected solvent at or near room temperature. Subsequent to the addition, the reaction mixture is refluxed for a short period of time of from about one-half hour to about three hours and it is then concentrated at reduced pressure to give an oxalyl chloride compound of Formula V. The crude oxalyl chloride is mixed with aluminum chloride and stirred together until the reactants are thoroughly mixed. The resulting mixture is heated rapidly by external means to a temperature of from about 100° C. to about 125° C. and stirring is continued until the evolution of hydrogen chloride ceases. The crude reaction mixture is hydrolyzed with ice water, the product extracted with a suitable solvent as, for example, chloroform, and the chloroform extracts concentrated to give the dione compound of Formula VI. Although the cyclization to the dione compound is usually carried out as indicated hereinabove, spontaneous cyclization of the oxalyl chloride compound to the dione may occur.

The dione compound of Formula VI is added to a basic aqueous solution and after stirring for a period of time to dissolve the compound, the dione is oxidized using hydrogen peroxide. The oxidized mixture is stirred until the reaction has been completed, the insoluble materials are extracted with benzene and the basic aqueous solution is carefully neutralized with three normal hydrochloric acid. The neutral solution is extracted with a suitable solvent, illustratively chloroform, the chloroform extracts are combined, dried and concentrated to an oil to give the carboxy compound of Formula VII.

By conventional means known to the art the compound of Formula VII is reacted with phenyllithium to give a compound of Formula II.

Alternate methods of preparing the starting material of Formula II are shown by procedures B and C.

The following preparations and examples are intended to illustrate the invention described herein without unduly restricting it.

PREPARATION 1

2,3,4,5-tetrahydrobenzazepine-1-oxalyl chloride 2,3,4,5-tetrahydrobenzazepine - 1 - oxalyl chloride was prepared by adding an ether solution of 2,3,4,5-tetrahydrobenzazepine dropwise to a well-stirred refluxing ether solution of oxalyl chloride. The end-point of the reaction was determined by thin layer chromatography. The ether solution was concentrated under reduced pressure to an oil.

PREPARATION 2

4,5,6,7-tetrahydroazepino[3,2,1-hi]indole-1,2-dione 2,3,4,5-tetrahydrobenzazepin-1-oxalyl chloride was heated at 50° C. to about 120° C. in polyphosphoric acid until the evolution of gas ceased. The mixture was cooled to 95° C. and poured into a large volume of vigorously stirred ice water. The precipitated product was collected by filtration and dried.

PREPARATION 3

2,3,4,5-tetrahydro-1H-benzazepine-9-carboxylic acid

A stirred slurry of 4,5,6,7-tetrahydroazepino[3,2,1-hi]indole-1,2-dione in water was treated with solid sodium hydroxide and the mixture stirred until all of the solid had dissolved. The reaction mixture was treated with a solution of 30% hydrogen peroxide in water and the mixture stirred for three hours. The mixture was filtered to remove precipitated material, the basic solution was carefully neutralized with concentrated hydrochloric acid and the product extracted from the neutral aqueous solution using chloroform. Concentration of the chloroform solution gave an oil which crystallized on standing.

PREPARATION 4

9-benzoyl-2,3,4,5-tetrahydrobenzazepine

Treating of an ether solution of 2,3,4,5-tetrahydro-1H-benzazepine-9-carboxylic acid with an ether solution of phenyllithium gave 9-benzoyl-2,3,4,5-tetrahydrobenzazepine.

PREPARATION 5

9-chloro-4,5,6,7-tetrahydro-azepino[3,2,1-hi]indole-1,2-dione

A stirred refluxing solution of 64 g. (0.5 mole) of oxalyl chloride in 75 ml. of chloroform was treated dropwise with 115 g. (0.08 mole) of 7-chloro-2,3,4,5-tetrahydrobenzazepine in 75 ml. of chloroform. When the addition was complete the mixture was heated for an additional 30 minutes and concentrated under vacuum. The resulting oil was triturated with ether, filtered and reconcentrated to give a dark oil. The crude oxanilic acid chloride (32 g.) was mixed with 258 g. (0.2 mole) of aluminum chloride and warmed quickly to 115° C. with stirring. After about 10 minutes the vigorous evolution of gas ceased and the mixture was cooled and hydrolyzed with ice. The insoluble product was filtered off and triturated with hot acetone. A sample was recrystallized from benzene-isooctane, M.P. 145–147° C. The yield was 12 g. (70%).

Analysis.—Calculated for $C_{12}H_{10}ClNO_2$ (percent): C, 61.16; H, 4.28; N, 5.94. Found (percent): C, 61.17; H, 4.32; N, 5.76.

PREPARATION 6

7-chloro-2,3,4,5-tetrahydro-1H-benzazepine-9-carboxylic acid monohydrate

A slurry of 10.5 g. (0.04 mole) of 9-chloro-4,5,6,7-tetrahydroazepino[3,2,1-hi]indole-1,2-dione in 150 ml. of water was treated with 13 g. of sodium hydroxide. After the solid material had dissolved the reaction mixture was treated with 15 ml. of 30% hydrogen peroxide in 150 ml. of water. The mixture was stirred for three hours, the basic solution carefully neutralized and the product extracted from the neutral aqueous solution with chloroform. The chloroform solution was concentrated to give 9.5 g. (94%) of product; the product analyzed as a hydrate. The compound softened at 94–96° C. and decomposed at 152–155° C.

Analysis.—Calculated for $C_{11}H_{14}ClNO_3$ (percent): C, 54.22; H, 5.79; N, 5.75. Found (percent): C, 54.30; H, 5.72; N, 5.59.

PREPARATION 7

9-benzoyl-7-chloro-2,3,4,5-tetrahydrobenzazepine

A stirred solution of 16 g. (0.071 mole) of 7-chloro-2,3,4,5 - tetrahydro-1H-benzazepine-9-carboxylic acid in 500 ml. of ether was treated with a filtered ether solution of phenyllithium prepared from 46 g. (0.28 mole) of bromobenzene and 3.88 g. (0.56 mole) of lithium wire. After refluxing overnight the reaction mixture was poured onto ice; the ether layer was separated and washed with dilute sodium hydroxide solution. The washed ether layer was concentrated to give 12.5 g. (67%) of product. A sample was molecularly distilled for analysis.

Analysis.—Calculated for $C_{17}H_{16}ClNO$ (percent): C, 71.45; H, 5.64; N, 4.90. Found (percent): C, 71.67; H, 5.69; N, 4.83.

EXAMPLE 1

9-benzoyl-1-bromoacetyl-2,3,4,5-tetrahydrobenzazepine

Five grams (0.02 mole) of 9-benzoyl-2,3,4,5-tetrahydrobenzazepine was dissolved in 50 ml. of chloroform and the solution was added to 100 ml. of water containing 20 g. of sodium carbonate. The vigorously stirred heterogeneous mixture was treated with 8.05 g. (0.04 mole) of bromoacetyl bromide. An additional 1 g. of bromoacetyl bromide was added to complete the reaction. The separated chloroform layer was dried over sodium sulfate and concentrated to an oil. The oil crystallized on being triturated with methanol; the product melted at 153–155° C.

Analysis.—Calculated for $C_{19}H_{18}NO_2Br$ (percent): C, 61.30; H, 4.87; N, 3.76. Found (percent): C, 61.12; H, 4.93; N, 3.73.

EXAMPLE 2

5-phenyl-1,9-tetramethylene-1,4-benzodiazepin-2-one

Two grams of 9-benzoyl-1-bromoacetyl-2,3,4,5-tetrahydrobenzazepine was dissolved in cold methanol saturated with ammonia and the solution stirred overnight. The methanol insoluble product which separated was removed by filtration. It melted at 208–209° C. and weighed 0.75 g. (47%).

Analysis.—Calculated for $C_{19}H_{18}N_2O$ (percent): C, 78.59; H, 6.24; N, 9.64. Found (percent): C, 78.09; H, 6.28; N, 9.58.

EXAMPLE 3

9-benzoyl-1-bromoacetyl-7-chloro-2,3,4,5-tetrahydrobenzazepine

Twelve grams (0.044 mole) of 9-benzoyl-7-chloro-2,3,4,5-tetrahydrobenzazepine in 100 ml. of chloroform was mixed with 20 g. of potassium carbonate and 100 ml. of ice water. The cold (0° C.) well-stirred heterogeneous mixture was treated dropwise with 10 g. (0.05 mole) of bromoacetyl bromide and then allowed to stir until room temperature was reached. The separated chloroform solution was concentrated to an oil. The oil solidified and was crystallized from isopropyl ether. The product weighed 11.5 g. (66%) and melted at 157–158° C.

Analysis.—Calculated for $C_{19}H_{17}BrClNO_2$ (percent): C, 56.11; H, 4.21; N, 3.44. Found (percent): C, 56.39; H, 4.24; N, 3.56.

EXAMPLE 4

7-chloro-5-phenyl-1,9-tetramethylene-1,4-benzodiazepin-2-one

A solution of 10 g. (0.025 mole) of 9-benzoyl-1-bromoacetyl-7-chloro-2,3,4,5-tetrahydrobenzazepine in 100 ml. of absolute ethanol was slowly treated with ammonia gas. After stirring for two hours at room temperature the reaction mixture was poured into water and extracted with chloroform. The chloroform extracts were dried and concentrated to an oil which solidified on standing. The crude material was recrystallized from benzene-isooctane; yield 5 g. (63%); M.P. 165–166° C.

Analysis.—Calculated for $C_{19}H_{17}ClN_2O$ (percent): C, 70.26; H, 5.28; N, 8.62. Found (percent): C, 69.68; H, 5.30; N, 8.38.

What is claimed is:
1. A compound selected from 1,4-benzodiazepin-2-ones having the formula:

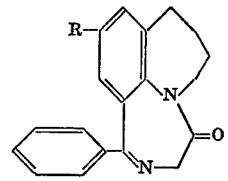

wherein:

R is selected from the group consisting of hydrogen and chlorine.

2. A compound of claim 1 which is 5-phenyl-1,9-tetramethylene-1,4-benzodiazepin-2-one.

3. A compound of claim 1 which is 7-chloro-5-phenyl-1,9-tetramethylene-1,4-benzodiazepin-2-one.

References Cited
UNITED STATES PATENTS
3,579,503   5/1971   Hester _____ 260—239.3 T

OTHER REFERENCES

Härter et al., "Acta. Chem. Scand.," vol. 22, No. 10 (1968).

HENRY R. JILES, Primary Examiner

R. T. BOND, Assistant Examiner

U.S. Cl. X.R.

424—244

UNITED STATES PATENT OFFICE
CERTIFICATE OF CORRECTION

Patent No. 3,794,646    Dated Feb. 26, 1974

Inventor(s) William John Welstead, Jr. and Ying-Ho Chen

It is certified that error appears in the above-identified patent and that said Letters Patent are hereby corrected as shown below:

Column 1, line 25, change "protest" to read --protect--; Column 3, formula V at line 35, change "COCO1" to read --COCOCl--.

Signed and sealed this 18th day of June 1974.

(SEAL)
Attest:

EDWARD M. FLETCHER, JR.
Attesting Officer

C. MARSHALL DANN
Commissioner of Patents